United States Patent [19]

Dickie et al.

[11] Patent Number: 4,775,931
[45] Date of Patent: Oct. 4, 1988

[54] DYNAMICALLY CONFIGURED COMPUTING DEVICE

[75] Inventors: James P. Dickie; David M. Rabinowitz, both of Corvallis, Oreg.;

[73] Assignee: Hewlett-Packard Company, Palo Alto, Calif.

[21] Appl. No.: 35,248

[22] Filed: Apr. 2, 1987

Related U.S. Application Data

[63] Continuation of Ser. No. 609,376, May 11, 1984, abandoned.

[51] Int. Cl.⁴ .................. G06F 13/00; G06F 12/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,902,162 | 8/1975 | Parkinson et al. | 364/200 |
| 4,124,887 | 11/1978 | Johnson et al. | 371/11 X |
| 4,268,901 | 5/1981 | Subrizi et al. | 364/200 |
| 4,303,993 | 12/1981 | Panepinto, Jr. et al. | 364/200 X |
| 4,373,181 | 2/1983 | Chisholm et al. | 364/200 |
| 4,556,953 | 12/1985 | Caprio et al. | 364/900 |
| 4,562,535 | 12/1985 | Vincent et al. | 364/200 |

Primary Examiner—Eddie P. Chan

[57] ABSTRACT

A computing system is presented which has a central processing unit (CPU) and peripheral devices. Identification registers associated with each peripheral device may be accessed by the CPU to identify characteristics of individual peripheral devices. Additionally, configuration registers within each peripheral device allow a particular peripheral device to determine whether instructions from the CPU are addressing that particular peripheral device.

4 Claims, 3 Drawing Sheets

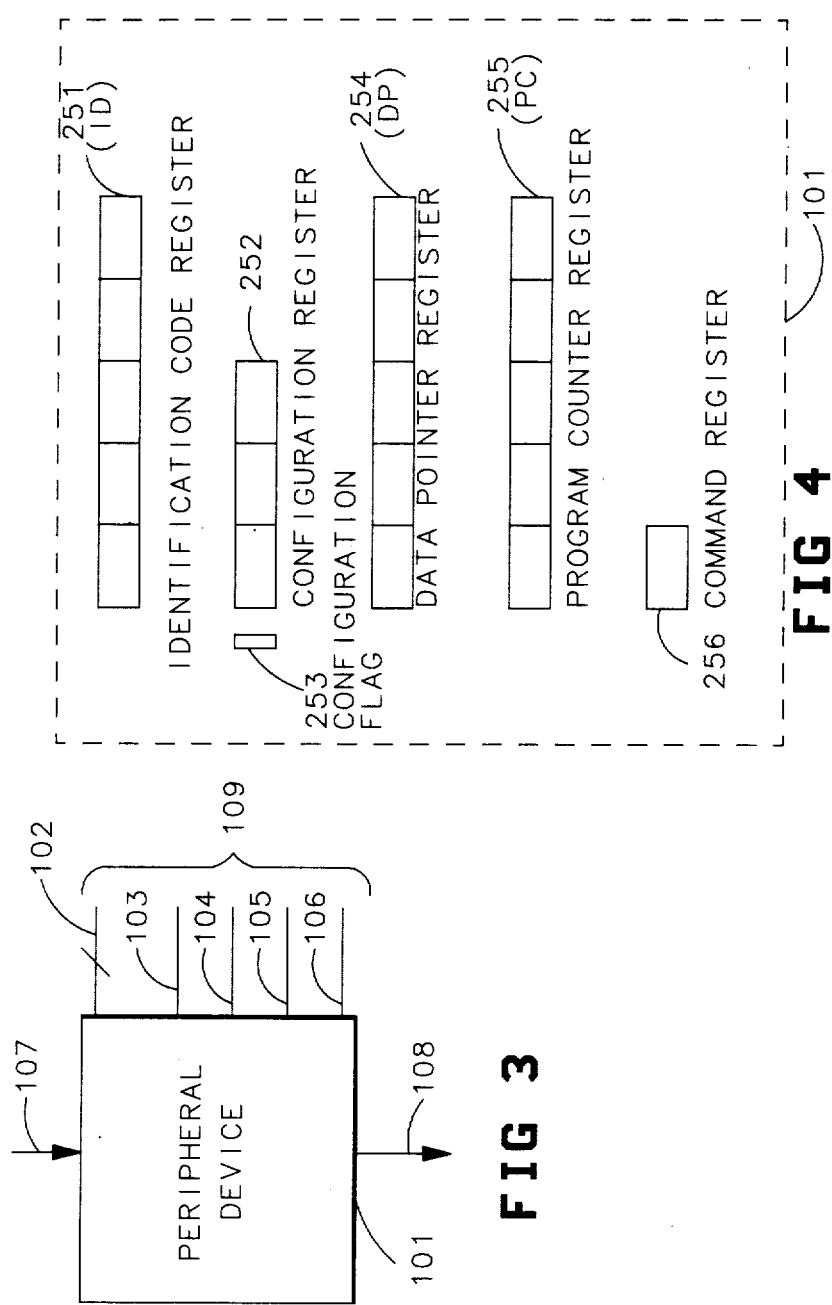

DYNAMICALLY CONFIGURED COMPUTING DEVICE

This application is a continuation of application Ser. No. 609,376, filed 5/11/84, now abandoned.

BACKGROUND

In typical computer systems, configuration of various system components is fixed. In a typical prior art static configuration scheme for a computing system, as shown in FIG. 1, a central processing unit (CPU) 50 is coupled to peripheral devices 51, 52, 53, and 54. Each device of peripheral devices 51-54 may be, for example, a memory device such as a random access memory (RAM) or a read only memory (ROM), or a non-memory device such as a display, printer, or communication controller. Peripheral devices 51-54 are coupled to CPU 50 through a bus 65. Each of peripheral devices 51-54 has assigned to it a fixed address. CPU 50 may independently interact with each of peripheral devices 51-54 by utilizing its fixed address. Peripheral devices 51-54 are each coupled to an associated address compare register 61-64 and an address select circuit 71-74. When CPU 50 or another device sends an instruction on bus 65, address compare registers 61-64 and address select circuits 71-74 screen the instruction so that each of the peripheral devices 51-54 responds only to instruction which include the fixed address assigned to that peripheral device.

The use of static configuration schemes, as that described above, inherently limits flexibility. Adding or removing devices becomes difficult, as some physical change in the system is required to allow a new device to be accessed or to indicate that a removed device is no longer present.

SUMMARY OF THE INVENTION

In accordance with the preferred embodiment of the present invention a computing system is presented which has a central processing unit (CPU) and peripheral devices which are dynamically configured by the CPU. Each peripheral device has a built-in identification code that identifies the characteristics of the peripheral device. The CPU can read the identification code to discover the peripheral device type (e.g., whether the peripheral device consists of a ROM, RAM, controller, or etc.) and other pertinent information about the peripheral device (e.g., memory size of a memory device).

Each peripheral device also contains a configuration register. The number of bits in each of the configuration registers is less than or equal to the number of bits used by the computer system for a full memory address. Each peripheral device also has a one-bit register referred to as a configuration flag. The state of the configuration flat in a particular peripheral device indicates whether that peripheral device has been configured by the CPU and thus whether the contents of the configuration register are valid.

After the CPU utilizes the identification code to determine the characteristics of a particular peripheral device, it uses this information to allocate address space to that peripheral device. The CPU then configures the peripheral device by writing one or more bits into the configuration register and setting the configuration flag of the peripheral device. Similarly, the CPU "unconfigures" or removes a peripheral device from configuration by clearing that peripheral device's configuration flag. In this way the CPU is able to dynamically adjust the configuration of the computer system.

BRIEF DESCRIPTION OF THE DRAWINGS

FIG. 3 is a schematic of a peripheral device in accordance with the preferred embodiment of the present invention.

FIG. 4 is a block diagram of registers within a peripheral device in accordance with the preferred embodiment of the present invention.

DESCRIPTION OF THE PREFERRED EMBODIMENT

Figure 1:
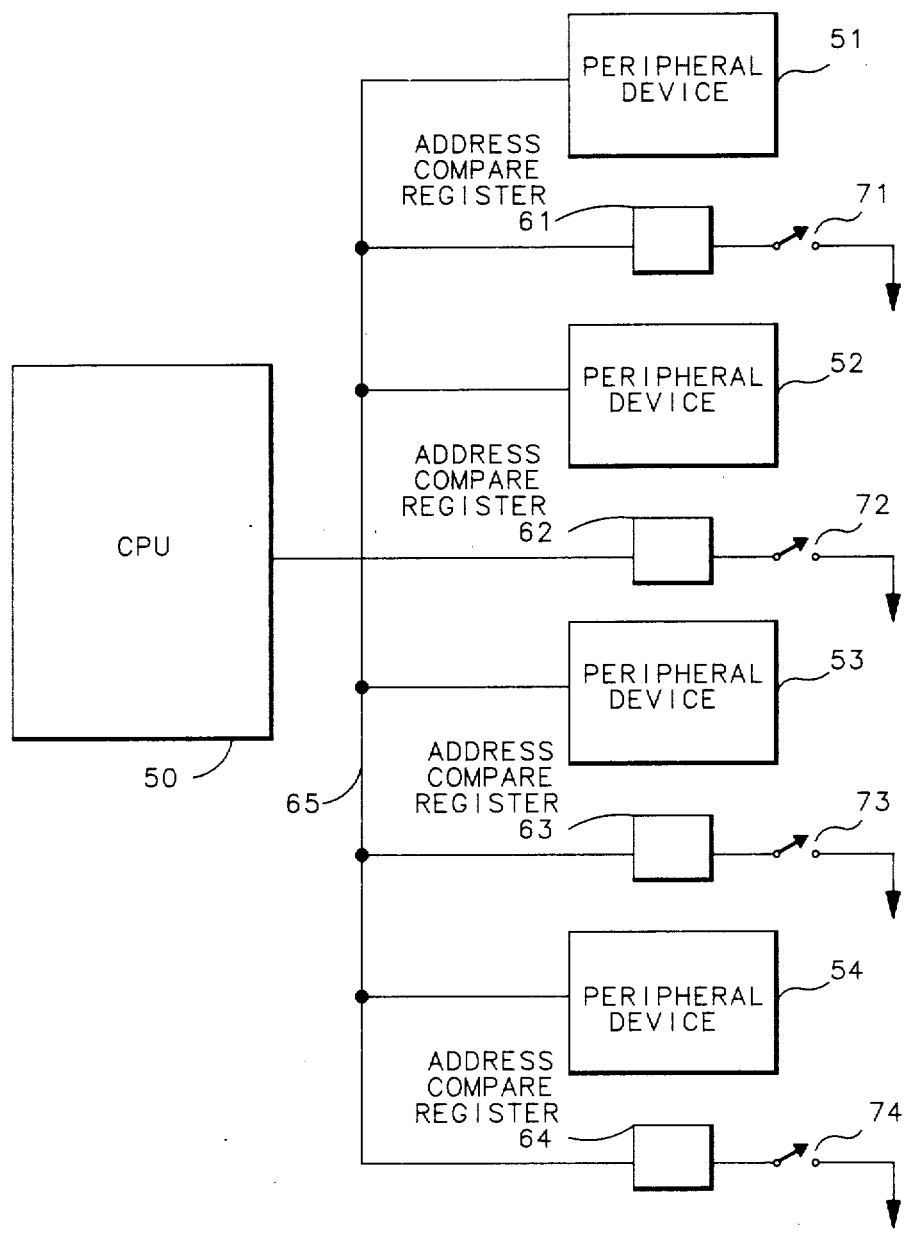
FIG. 1 is a schematic of a prior art configuration scheme for a computing device.
Figure 2:
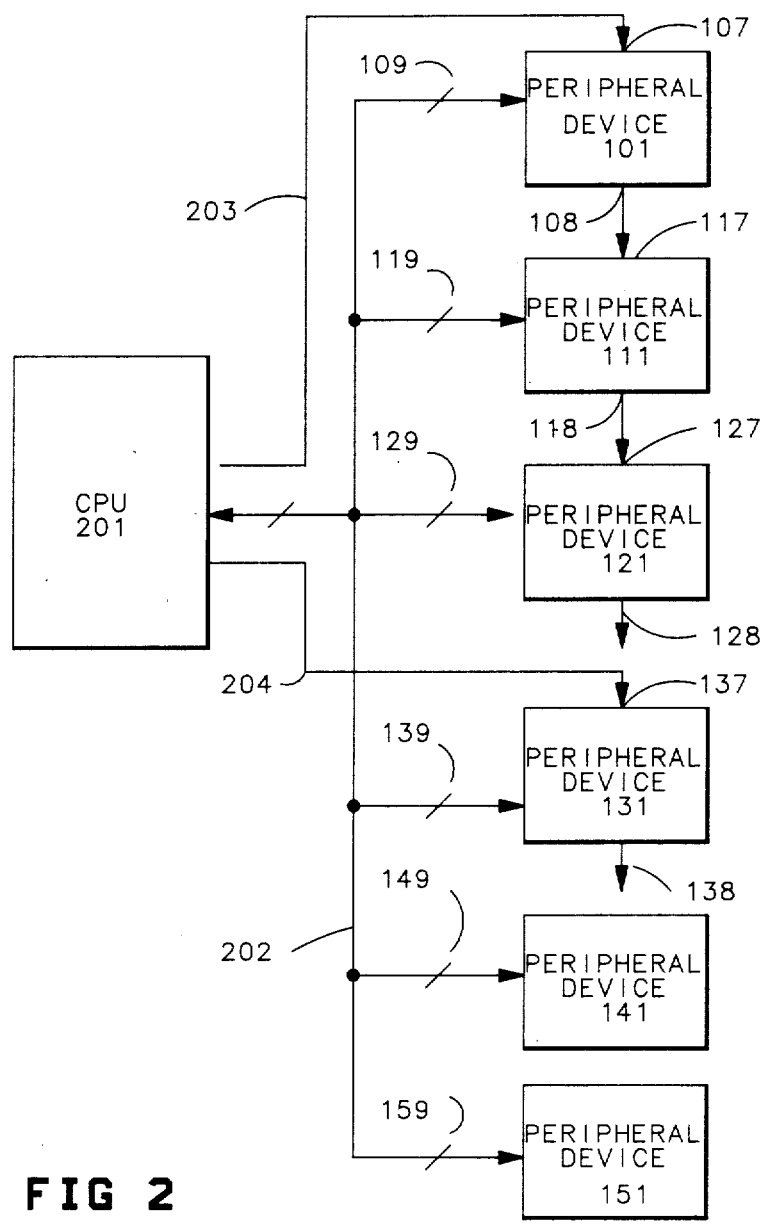
FIG. 2 is a schematic of a central processing unit (CPU) coupled to a series of peripheral devices in accordance to the preferred embodiment of the present invention.

In FIG. 2 a central processing unit (CPU) 201 is coupled to a series of peripheral devices 101, 111, 121, 131, 141, and 151. Each peripheral device 101, 111, 121, 131, 141 and 151 has an associated bus labeled 109, 119, 129, 139, 149, and 159 respectively. Busses 109, 119, 129, 139, 149, and 159 are coupled in parallel to a bus 202 which is in turn coupled to CPU 201.

CPU 201 sends commands and data to perhiperal devices 101, 111, 121, 131, 141, and 151 on its bus 202 which is coupled to busses 109, 119, 129, 139, 149, and 159. CPU 201 receives data from peripheral devices 101, 111, 121, 131, 141, and 151 through their respective busses 109, 119, 129, 139, 149, and 159 coupled to CPU 201's bus 202.

Each bus 109, 119, 129, 139, 149, and 159 is identical to each of the other busses 109, 119, 129, 139, 149, and 159. The structure of bus 109 is seen in FIG. 3. Each bus has several lines consisting of a ground line 106, a power line 105, a command line 104, a strobe line 103, and a collection of data lines 102. In the present embodiment there are four data lines in data lines 102. Ground line 106 is held at a constant voltage of 0.0 volts. Power line 105 is held at a constant voltage different from 0.0 volts, for example +4.5 volts. Command line 104 is normally driven by CPU 201 but may occasionally be driven by one or more of peripheral devices 101, 111, 121, 131, 141, or 151. Strobe line 103 is driven exclusively by CPU 201, and data lines 102 are driven by either CPU 201 or by one of peripheral devices 101, 111, 121, 131, 141, or 151. A line is at logic 0 when it is held at the same voltage as ground line 106 and is at logic 1 when it is held at the same voltage as power line 105. Strobe line 103 is asserted when it is held at logic 0 and is unasserted when it is held at logic 1. Command line 104 is asserted when it is held at logic 0 and is unasserted when it is held at logic 1. Information on data lines is data when command line is unasserted and is a command when command line is asserted. Information on data lines 102 is valid immediately prior to and during the transition of strobe line 103 from a state of assertion to a state of unassertion.

In FIG. 2, peripheral devices 101, 111, 121, and 131 are replaceable modules while peripheral devices 141 and 151 are permanent. Each of replaceable peripheral devices 101, 111, 121, and 131 is coupled to a daisy-chain 203 or a daisy-chain 204. In the present embodiment peripheral devices 101, 111, and 121 are coupled to daisy-chain 203 commencing at CPU 201 while peripheral device 131 is coupled to another daisy-chain 204 also commencing at CPU 201. Daisy-chain 203 commences at CPU 201, enters peripheral device 101 at daisy-chain input 107 and exits at daisy-chain output 108, enters peripheral device 111 at daisy-chain input 117 and exits at daisy-chain output 118, and enters peripheral device 121 at daisy-chain input 127 and exits at daisy-chain output 128 at which daisy-chain 203 terminates. Daisy-chain 204 commences at the CPU 201 and enters peripheral device 131 at daisy-chain input 137 and exits at daisy-chain output 138 at which daisy-chain 203 terminates. Daisy-chains 203 and 204 are driven by CPU 201, and are considered to be asserted when held at logic 1 and unasserted when held at logic 0.

In FIG. 4, registers within peripheral device 101 are shown. Identification code register (ID) 251, 20 bits long in the preferred embodiment, contains information identifying characteristics of peripheral device 101. CPU 201 can read ID 251 to determine the function of peripheral device 101 (e.g., whether the peripheral device 101 contains a ROM, RAM, controller, memory-mapped I/O device) and to discover other pertinent information about peripheral device 101 (e.g., the memory size). Only replaceable peripheral devices 101, 111, 121, and 131 need have an ID. Permanent peripheral devices 141 and 151 do not need to have an ID.

Peripheral device 101 also has a configuration register 252. Configuration register 252 contains fewer bits than the number of bits required by CPU 201 to access its entire memory space (the number of bits required by CPU 201 to access its entire memory space is hereinafter referred to as CPU address length, e.g., in the present embodiment CPU address length is 20 bits). Configuration register 252, for example, may be 12 bits long, while peripheral devices 111, 121, 131, 141, and 151 may have configuration registers containing more or fewer bits depending upon the memory size of each particular peripheral devices. The contents of configuration register 252 indicates to peripheral 101 the memory address(es) peripheral device 101 has been assigned by CPU 201.

A configuration flag 253 is a one-bit register which is set when CPU 201 has assigned memory address(es) to peripheral device 101 (i.e. peripheral device 101 is configured). Configuration flag 253 is reset when CPU 201 has not yet assigned memory address(es) or when CPU 201 has explicitly unassigned (i.e. unconfigured) memory addresses priorly assigned to peripheral device 101.

Peripheral device 101 also contains a command register 256 which contains a number of bits equivalent to the number of data lines in data lines 102, e.g., four bits in the present embodiment. Command register 256 is used to store a current command sent by CPU 201 (see Table I). Each peripheral device 111, 121, 131, 141, and 151 contains a command register.

Peripheral device 101 also contains a data pointer register (DP) 254 and a program counter register (PC) 255. DP 254 and PC 255 each contain a number of bits equal to the CPU address length. Each peripheral device 111, 121, 131, 141, and 151 contains a DP and may contain a PC depending upon its function.

If peripheral device 101 is unconfigured, CPU 201 may configure it as follows. CPU 201 assigns to peripheral device a range of one or more addresses which can be directly addressed by CPU 201. In order to do this CPU 201 first asserts daisy-chain input 107. Then CPU 201 examines ID 251 to determine the characteristics of peripheral device 101. CPU 201 issues a "CONFIGURE" command (i.e. sends a binary code corresponding to a CONFIGURE command, see Table I) and then transfers a configuration address, in this case 20 bits of data, to peripheral device 101. Peripheral device 101 copies the 12 high-order bits into configuration register 252 and sets flag 253, indicating that it is configured.

CPU 201 may also unassign (unconfigure) the memory address(es) of peripheral device 101. In order to do so CPU 201 issues a "Load DP" command (see Table I) and then transfers over data bus 201 a 20 bit address corresponding to the configuration address assigned to peripheral device 101. Each peripheral device 101, 111, 121, 131, 141, 151 then places this address into its DP. CPU 201 then sends an "UNCONFIGURE" command (see Table I). Each peripheral device compares the contents of its configuration register with a corresponding number of high order bits within its DP register. Since in this case the address contained in the DP registers corresponds to the configuration address assigned to peripheral device 101, peripheral device 101 will reset configuration flag 253.

In the same way as it configures and unconfigures peripheral device 101, CPU may configure and unconfigure the other peripheral devices. When configured each peripheral device has a unique configuration address, thereby allowing CPU 201 to address each of peripheral devices 101, 111, 121, 131, 141, and 151 individually.

When a peripheral device's configuration flag is reset, that peripheral device holds its daisy-chain output line unasserted. Thus when peripheral device 101 is unconfigured its daisy-chain output line 108 is held unasserted regardless of the value of its daisy-chain input line 107. When a peripheral device's configuration flag is set that peripheral device holds its daisy-chain output line at the same value as its daisy-chain input line. Thus when peripheral device 101 is configured (configuration flag 253 is set) its daisy-chain output line 108 is held at the same logic level as its daisy-chain input line 107.

Once configured, peripheral device 101 utilizes the contents of configuration register 252 to evaluate whether commands issued by CPU 201 are addressing it. For instance, when a PC READ is issued, peripheral device 101 will compare the contents of PC 255 with the contents of configuration register 252 to determine whether CPU 201 is addressing memory space within peripheral device 101. In the same way, upon the receipt of a PC READ each peripheral device 111, 121, 131, 141, and 151 will also compare the contents of its PC with the contents of its configuration register to determine whether CPU 201 is addressing it. Only the peripheral device addressed by CPU 201 will respond to commands issued by CPU 201.

The PC of each peripheral device 101, 111, 121, 131, 141, and 151 at any particular time all contain the same value. When CPU 201 issues a LOAD PC instruction, each peripheral device 101, 111, 121, 131, 141, and 151 simultaneously loads a new value into its PC. Similarly, the DP of each peripheral device 101, 111, 121, 131, 141, and 151 at any particular time all contain the same value.

Except when there is a nibble transfer across data lines 102, CPU 201 holds strobe line 102 unasserted. When making a nibble transfer across data lines 102, CPU 201 strobes (i.e. asserts then unasserts strobe line 103) as described in Table I.

Except when transfering command codes (i.e. binary codes, see Table I) to peripheral devices 101, 111, 121, 131, 141, and 151, CPU 201 holds command line 104 unasserted. To send a command code CPU 201 places on data lines 102 logic levels (i.e. logic 0s and logic 1s) corresponding to the command code of each command (see Table I). CPU 201 then asserts command line 104 and strobes (asserts and then unasserts) strobe line 103. Each peripheral device 101, 111, 121, 131, 141, and 151 copies the command code into its command register (e.g. command register 256 of peripheral device 101) as strobe line 103 is unasserted by CPU 201. CPU 201 then unasserts command line 104. The contents of the command register of each peripheral device 101, 111, 121, 131, 141 and 151 is interpreted by that peripheral device and will indicate how each peripheral device will respond to subsequent data on data lines 102, or whether it will apply data to data lines 102.

The following table gives a list of commands, their binary codes and a summary of the action take by peripheral devices 101, 111, 121, 131, 141, and 151.

TABLE I

| Binary Code | Command | Summary of action |
|---|---|---|
| 0000 | NOP | All peripheral devices ignore strobe (strobes are received by each peripheral device on strobe line 103) until next control code is sent. |
| 0001 | ID | An unconfigured peripheral device which sees its daisy-chain input at logic 1 sends its ID nibbles on following strobes starting with the low-order nibble. |
| 0010 | PC READ | BUS→(PC). The peripheral device addressed by the high-order bits of the program counter sends data pointed to by its PC register on each following strobe and all peripheral devices increment their PC registers after each strobe. A dummy strobe will immediately follow the issuance of PC READ. |
| 0011 | DP READ | BUS→(DP). The peripheral device addressed by the high-order bits of the data pointer sends data pointed to by its DP register on each following strobe and all peripheral devices increment their DP registers after each strobe. A dummy strobe will immediately follow the issuance of a DP READ. |
| 0100 | PC WRITE | (PC)→BUS. The peripheral device addressed by the high-order bits of the program counter loads data on following strobes into a location pointed to by its PC register and all peripheral devices increment their PC registers after each strobe. |
| 0101 | DP WRITE | (DP)→BUS The peripheral device addressed by the high-order bits of the data pointer loads data on following strobes into the a location pointed to by its DP register and all peripheral devices increment their DP register after each strobe. |
| 0110 | LOAD PC | BUS→PC. All peripheral devices load the data on following strobes into their PC registers starting with the low-order nibble. After all 5 nibbles are transferred the command code is automically changed to a PC READ (0010). |
| 0111 | LOAD DP | BUS→DP. All peripheral devices load the data on following strobes into their DP registers starting with the low-order nibble. After all 5 nibbles are transferred the command code is automically changed to a DP READ (0011). |
| 1000 | CONFIGURE | The unconfigured peripheral device that sees its DAISY-CHAIN input high loads the following five data nibbles into its configuration register starting with the low-order nibble. |
| 1001 | UNCONFIGURE | The peripheral device currently addressed by its data pointer will unconfigure itself. The device will then respond to CONFIGURE and ID bus commands only. The local DP must be loaded immediately preceding an UNCONFIGURE command. |
| 1010 | POLL | All peripheral devices that require service pull one data line high during the next strobe low. |
| 1011 | Reserved | |
| 1100 | BUSCC | The peripheral device currently addressed by its local DP will perform a specialized operation as defined by the |

TABLE I-continued

| Binary Code | Command | Summary of action |
| --- | --- | --- |
| | | individual peripheral device |
| 1101 | Reserved | |
| 1110 | SHUTDOWN | Each peripheral device responds to this command based on its own specialized requirements. |
| 1111 | RESET | All peripheral devices perform local reset, including resetting their configuration flags if they are replaceable peripheral devices |

We claim:

1. A computing device comprising:

CPU means for processing data;

a first peripheral device coupled to the CPU means, the first peripheral device including a first plurality of memory locations which serve as directly addressable memory for the CPU means, and first configuration register means, coupled to the first plurality of memory locations, for storing bits which serve as high order bits of addresses for the memory locations within the first plurality of memory locations;

identification register means coupled to the first peripheral device for storing data identifying characteristics of the first peripheral device, wherein the first peripheral device provides the CPU means with data from the identification register means in order to identify to the CPU means the amount of memory locations within the first plurality of memory locations;

a second peripheral device coupled to the CPU means, the second peripheral device comprising a second plurality of memory locations which serve as directly addressable memory for the CPU, and second configuration register means coupled to the second plurality of memory locations for storing bits which serve as high order bits of addresses for the memory locations within the second plurality of memory locations; and, daisy-chain means coupled to the CPU, the first peripheral device, and the second peripheral device for allowing the CPU to separately initialize the first configuration register means and the second configuration register means, the second peripheral device having a daisy-chain input line connected to a daisy-chain output line of the first peripheral device, and a daisy-chain input line of the first peripheral device being connected to the CPU means, wherein the first peripheral device includes flag means responsive to command from said CPU means for indicating that the first peripheral device is configured and wherein the first peripheral device includes means for changing a signal on the daisy-chain output line of the first peripheral device based on a signal on the daisy-chain input line of the first peripheral device.

2. A computing device as in claim 1 wherein the high order bits stored in the first configuration register means in the first peripheral device define a first address space, wherein the high order bits stored in the second configuration means in the second peripheral device define a second address space, and wherein the first address space is not equal to the second address space.

3. A computing device as in claim 2 wherein the first peripheral device additionally comprises:

data pointer register means for storing a third address to which the CPU means requests access, wherein the first peripheral device compares contents of the first configuration register means with high order bits from the third address to determine whether the address addresses memory within the first address space.

4. In a computing system having a central processing unit, a first peripheral device having a first plurality of memory locations directly addressable by the central processing device and a second peripheral device having a second plurality of memory locations directly addressable by the central processing device, wherein the second peripheral device has a daisy-chain input line connected to a daisy-chain output line of the first peripheral device and a daisy-chain input line of the first peripheral device is connected to the central processing unit, a method by which the central processing unit assigns addresses to the first plurality of memory locations within the first peripheral device and the second peripheral device, the method comprising:

examining contents of an identification register within the first peripheral device by the central processing unit to determine the amount of memory locations within the first peripheral device;

transferring to the first peripheral device a first configuration address which indicates the address of the first peripheral device in the computing system address space;

storing high order bits of the first configuration address to identify the high order bits of the address of each memory location in the first plurality of memory locations;

examining contents of an identification register within the second peripheral device by the central processing unit to determine the amount of memory locations within the second peripheral device;

transferring to the second peripheral device a second configuration address which indicates the address of the second peripheral device in the computing system address space;

storing high order bits of the second configuration address to identify the high order bits of the address of each memory location in the second plurality of memory locations;

indicating with a flag that the first peripheral device has been configured; and changing a signal on the daisy-chain output line of the first peripheral device based on a signal on the daisy-chain input line of the first peripheral device.

* * * * *